(12) United States Patent
Ratliff

(10) Patent No.: US 6,418,745 B1
(45) Date of Patent: Jul. 16, 2002

(54) HEAT POWERED HEAT PUMP SYSTEM AND METHOD OF MAKING SAME

(75) Inventor: Frank W. Ratliff, Alpine, CA (US)

(73) Assignee: Mechanical Solutions, Inc., Alpine, CA (US)

( * ) Notice: Subject to any disclaimer, the term of this patent is extended or adjusted under 35 U.S.C. 154(b) by 0 days.

(21) Appl. No.: 09/813,504

(22) Filed: Mar. 21, 2001

(51) Int. Cl.[7] ................................................. F25B 27/00
(52) U.S. Cl. ..................... 62/324.6; 62/235.1; 62/238.7
(58) Field of Search ............................ 62/324.1, 324.6, 62/236, 235.1, 238.7, 510, 524, 525, 159, 160

(56) References Cited

U.S. PATENT DOCUMENTS

| | | | | |
|---|---|---|---|---|
| 3,411,538 A | * | 11/1968 | Gruner et al. | 137/625 |
| 4,226,091 A | * | 10/1980 | Nowacki | 62/323 |
| 4,226,606 A | * | 10/1980 | Yaeger et al. | 62/238 |
| 4,383,418 A | * | 5/1983 | Holzer | 62/25.1 |
| 4,727,727 A | * | 3/1988 | Reedy | 62/238.6 |
| 6,094,926 A | * | 8/2000 | Nakayama et al. | 62/236 |
| 6,164,331 A | * | 12/2000 | Sugita et al. | 137/625.43 |

* cited by examiner

Primary Examiner—Denise L. Esquivel
Assistant Examiner—Melvin Jones
(74) Attorney, Agent, or Firm—Richard D. Clarke

(57) ABSTRACT

A new and improved heat powered heat pump system and method of making same is provided. More particularly, the present invention relates to a heat powered heat pump system which uses standard commonly available refrigerant fluids, supplements pressurizing the refrigerant fluid by use of an external available heat source, enables selective switching between heating or cooling modes, and utilizes a thermal four-chambered compressor having a double piston head that is partially powered by an external heat source. Since the heat powered heat pump system may be made in various sizes and configurations, it may be utilized to cool and heat the interior of vehicles using waste engine heat and an initializing battery powered heating element to provide for immediate heating and cooling. The heat powered heat pump system attains better efficiency than current systems employed for the same purpose because of its capability to use a heat source such as a solar collector, waste heat from a generator, vehicle engine or power plant, various types of fuel cells, and a gas-fired or electrical heating element to power the four-chambered thermal compressor.

24 Claims, 6 Drawing Sheets

HEAT POWERED HEAT PUMP SYSTEM AND METHOD OF MAKING SAME

BACKGROUND OF THE INVENTION

1. Field of the Invention

The present invention relates to a new and improved heat powered heat pump system and method of using it. More particularly, the present invention relates to a heat powered heat pump system which would utilize relatively low temperature heat energy, waste energy or direct electrical energy to implement the heat pump process for the purpose of selectively cooling or heating an interior space more efficiently.

2. Description of the Related Art

High energy costs and environmental concerns over the generation of pollution are requiring more energy efficient mechanisms for heating and cooling interior spaces utilizing renewable energy resources and, in some cases, waste heat from any number of sources. Such a mechanism must be easily adapted to a number of different energy sources without the need for expensive or customized adaptors.

The interior spaces which require heating and cooling are not limited to living and working environments, but also extend to space involved in transportation for humans as well as perishable commodities. The means of providing heating and cooling must be economical, efficient to manufacture and inexpensive to maintain in order to be readily accessible for any number of applications in everyday life.

The standard Carnot reversible heat pump cycle, as simplified by use of a throttling valve for expansion of the refrigerant fluid and a mechanical compressor for the compression of the vapor, has been in use for a wide variety of applications, and is well known. Essentially, in the cooling mode, such systems pass saturated liquid refrigerant through an expansion valve to a lower pressure, the temperature of the refrigerant falls, and the cooled refrigerant is then directed to an evaporator where heat is absorbed from the atmosphere, thereby cooling said atmosphere (or some other medium where cooling is desired).

This cycle is frequently reversible such that the same system is used as a heat pump. To provide heating of a space, energy is added to the system by a compressor and ambient air. Most of the prior art devices which accomplish this task are known to consume large amounts of energy (usually electrical energy), and are inefficient in both the cooling and heating modes.

However, the benefits of heat powered heat pump devices designed for use in the home or office are well known. Examples of different types and kinds of arrangements and techniques for utilizing heat powered heat pumps are disclosed in U.S. Pat. Nos. 4,918,837, 4,617,801, 4,537,037, RE 31,281 and 4,250,715.

In general, the standard vapor-compression cycle is the commonly used system to cool interior space. This cycle can be reversed to supply heat to interior space, and such a system that can cool and heat interior space is referred to as a "heat pump".

This vapor-compression cycle utilizes a compressor unit to compress refrigerant vapor to perform the cooling/heating process. The compressor component is conventionally a rotary device that requires external rotary shaft power to perform its compression function. This rotary shaft power is commonly supplied by an electric motor or, in the case of vehicles, an internal combustion engine.

Heat pumps for heating and cooling interior spaces in vehicles are generally known in the prior art. Such a device is described in U.S. Pat. No. 4,918,937. The claimed device comprises a hybrid system which uses both a mechanical and a thermal compressor. The mechanical compressor initiates cooling of the passenger compartment and the engine driven compressor is started after the compartment is precooled.

This novel invention, while allowing for lower fuel consumption over conventional cooling mechanisms for automobiles, requires the use of both a mechanical and a thermal compressor. The mechanical compressor would require energy in order to function just as conventional cooling systems for automobiles with associated energy losses. In addition, the mechanism would be complex, bulky, expensive to manufacture and potentially very costly to maintain.

Furthermore, this inventive device provides for cooling of passenger compartments, so another entire unit would have to be provided for heating the passenger compartment, resulting in additional weight, bulk, equipment and further expense. Additionally, this invention is designed specifically for automobiles with no mention or suggestion of conversion to other applications or usages.

Therefore, it would be highly desirable to have a new and improved heat powered heat pump system and method for making same which would allow the expedited cooling or warming of an interior space, efficiently utilize available waste heat, a renewable energy source, or direct electrical energy at much greater efficiency to facilitate the heat pump process, have a multitude of potential applications, be economical to manufacture and maintain and be readily adapted to a variety of sizes and uses.

The device described in U.S. Pat. No. 4,617,801 addresses the problem of providing for both heating and cooling capacities in a single unit. This unique invention uses thermally powered dual reciprocating compressors and any number of closed heat transfer loops. The size and complexity of this invention would make it impractical for use in small confined areas such as the interior space of an automobile. Additionally, there is no mechanism to provide for the near instantaneous initiation of heating or cooling that has come to be expected in heating or cooling such low volume spaces.

Therefore, it would be highly desirable to have a new and improved device and method for making same for a heat powered heat pump which would allow immediate cooling or warming of an interior space, utilize waste heat, a renewable energy source or direct electrical energy at much greater efficiency to perform the heat pump process, have a multitude of potential applications, be economical to manufacture and maintain and be readily adapted to a variety of usages.

U.S. Pat. No. 4,537,037 also describes a device that addresses the problem of providing for both heating and cooling options in a single unit. However, the device is complex in structure, employing two or more compressors and three or more closed loops and three or more different refrigerants, as well as three or more evaporators. The device uses sequential displacement and necessarily utilizes a series of interconnected subsystems in order to accomplish the heating or cooling of a space within a structure.

Because of the complexity and consequential enormous size of the resulting device, the primary object of this invention is necessarily aimed at the cooling or heating of relatively large structures, for example buildings. The unit would not be practical for the use in a small volume space such as in a vehicle.

In addition, the invention does not provide for the immediate heating or cooling of a confined space that would be expected in automobiles.

Therefore, it would be highly desirable to have a new and improved device and method for making same for a heat powered heat pump which would allow immediate cooling or warming of an interior space, utilize waste heat, a renewable energy source or direct electrical energy at much greater efficiency to perform the heat pump process, have a multitude of potential applications, be economical to manufacture and maintain and be readily adapted to a variety of usages.

U.S. Pat. No. RE 31,281 describes a device that has a two heat exchangers, one of which communicates with a source of air outside a structure and one of which communicates with a source of air inside a structure. While the invention provides for both a heating and a cooling system, it is primarily designed to heat and cool structures rather than small confined spaces.

Additionally, the invention utilizes a natural gas fired vapor generator which is then used to power a steam turbine or turbo generator unit. This complex heat pump does not provide for utilization of renewable energy sources, direct electrical energy, or waste heat to facilitate or perform the heat pump process.

Therefore, it would be highly desirable to have a new and improved device and method for making same for a heat powered heat pump which would allow immediate cooling or warming of an interior space, utilize waste heat, a renewable energy source or direct electrical energy at much greater efficiency to perform the heat pump process, have a multitude of potential applications, be economical to manufacture and maintain and be readily adapted to a variety of usages.

Finally, U.S. Pat. No. 4,250,715 provides for a heat transfer system utilizing standard vapor/compression refrigeration cycle. This novel invention also provides for both heating and cooling of an interior space. However, the heat pump utilizes conventional power sources such as electric motors to provide energy to the compressors which then perform the vapor-compression process. If the heat from another source such as solar panels, waste heat or direct electrical energy were to be utilized to provide energy to a thermal compressor, there would be less demand on energy from non-renewable sources providing for a more efficient and economical method of heating and cooling an interior space.

Therefore, it would be highly desirable to have a new and improved device and method for making same for a heat powered heat pump which would allow immediate cooling or warming of an interior space, utilize waste heat, a renewable energy source or direct electrical energy at much greater efficiency to perform the heat pump process by utilizing a thermal compressor, be economical to manufacture and maintain and be readily adapted to a variety of usages.

SUMMARY OF THE INVENTION

Therefore, the principal object of the present invention is to provide a new and improved device and method for making same, for a heat powered heat pump that can utilize waste heat or heat generated by alternative means, to power a thermal compressor and to more efficiently heat or cool a space. The subject heat powered heat pump system can cool and can heat an interior space by employing a switching means to reversing the cycle. Moreover, the subject system may be readily adapted for either heating or cooling only by selectively eliminating specified components from said system.

It is a further object of the present invention to provide such a new and improved device and method for making same, for a heat powered heat pump with a four-chambered, double piston thermal powered compressor. The thermal compressor would eliminate the necessity of an additional external energy source, commonly direct electrical energy, for powering a purely mechanical compressor. This feature facilitates the use of waste heat, solar collectors or direct electrical energy at much greater efficiency to power the compressors, and provides for economical manufacture and maintenance of the entire unit as well.

It is a further object of the present invention to provide such a new and improved device and method for making same, for a heat powered heat pump, which could be made in such a manner that it might be used to heat or cool a small confined space such as the interior of an automobile. The device would be adaptable so as to be readily used in conjunction with a conventional internal combustion engine utilizing waste heat to power thermal compressors or with electric engines using direct electric heating elements at much greater efficiency to power thermal compressors.

It is yet a further object of the present invention to provide such a new and improved device and method for making same, for a heat powered heat pump, which would also allow for an both direct electric heating elements from batteries to initially power the thermal compressors. The device would then switch to waste engine heat when the temperature is sufficient to power the thermal compressors. This would allow for immediate heating or cooling in the interior space of buildings or automobiles which has become expected in modern heating and cooling systems, at much greater efficiency.

It is yet a further object of the present invention to provide such a new and improved device and method for making same, for a heat powered heat pump, which would be inexpensive to manufacture and maintain. The design of the device provides a simple, yet effective means by which to provide heating and cooling for interior spaces without excessively complex motorization or mechanization. Since the present invention lacks complex mechanisms and motorization and is considerably less expensive to manufacture, the initial cost to procure this device is relatively low, and repairs to the device are inexpensive and required much less frequently.

Briefly, the above and further objects of the present invention are realized by providing a new and improved heat powered heat pump system and method of making it. More particularly, the present invention relates to a heat powered heat pump system which uses standard commonly available refrigerant fluids, supplements pressurizing the refrigerant fluid by use of an external available heat source, enables selective switching between heating or cooling modes, and utilizes a thermal four-chambered compressor having a double piston head that is partially powered by an external heat source. Since the heat powered heat pump system may be made in various sizes and configurations, it may be utilized to cool and heat the interior of automobiles using waste engine heat and an initializing battery powered heating element to provide for immediate heating and cooling. The heat powered heat pump system attains better efficiency than current systems used for the same purpose because of its capability to use a heat source such as a solar collector, waste heat from a generator, vehicle engine or power plant, various types of fuel cells, and a gas-fired or electrical heating element to power the four-chambered thermal compressor.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENTS

Figure 1:
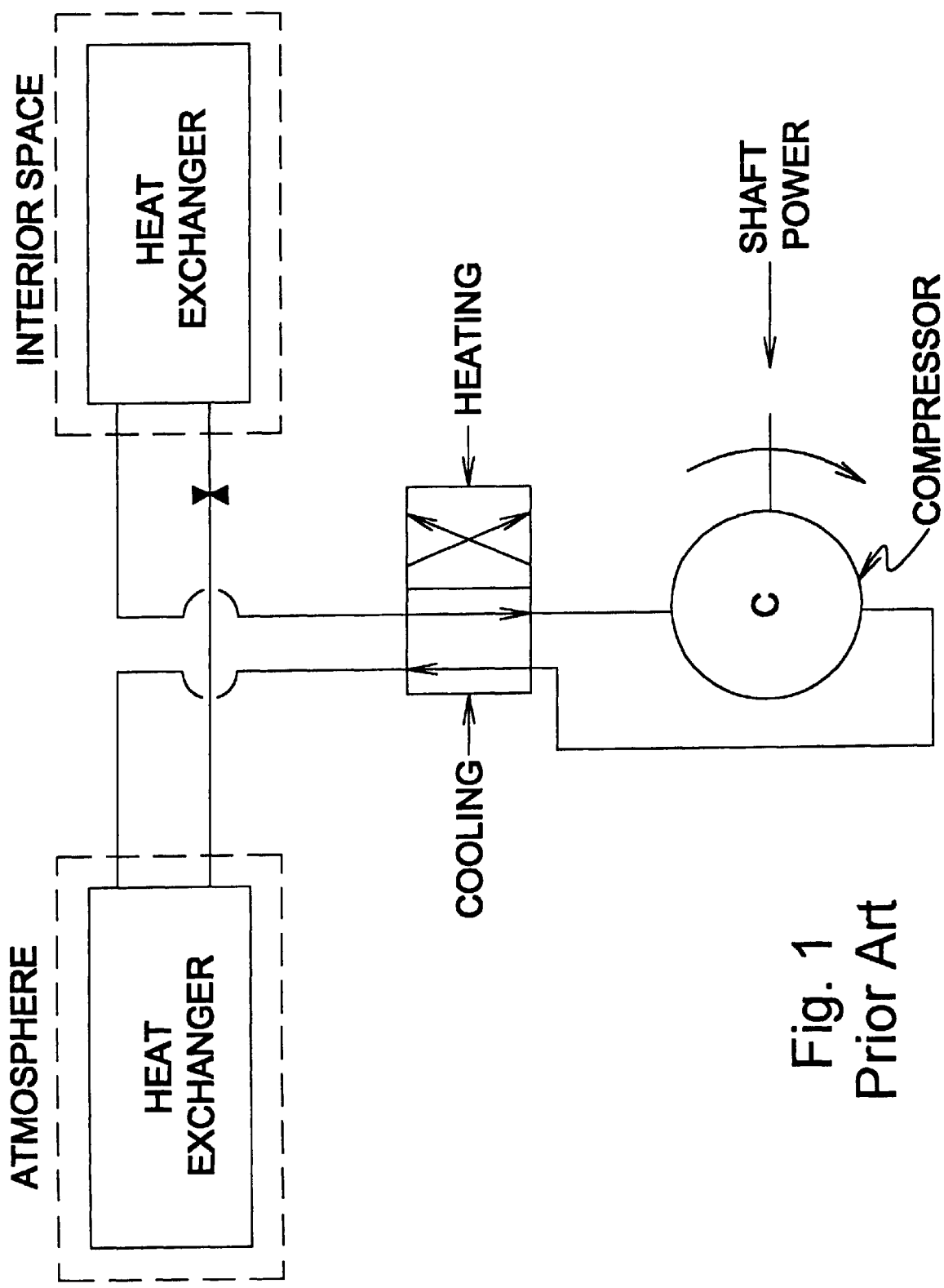
FIG. 1 is a schematic representation of a conventional prior art heat pump device.

Referring now to the drawings, and more particularly to FIG. 1 thereof, there is shown a typical prior art system for a conventional heat pump device. This conventional heat pump system requires that a common compressor unit be driven by direct electric motor energy input, or power transferred from a rotating shaft, as in a vehicle system.

Figure 2:
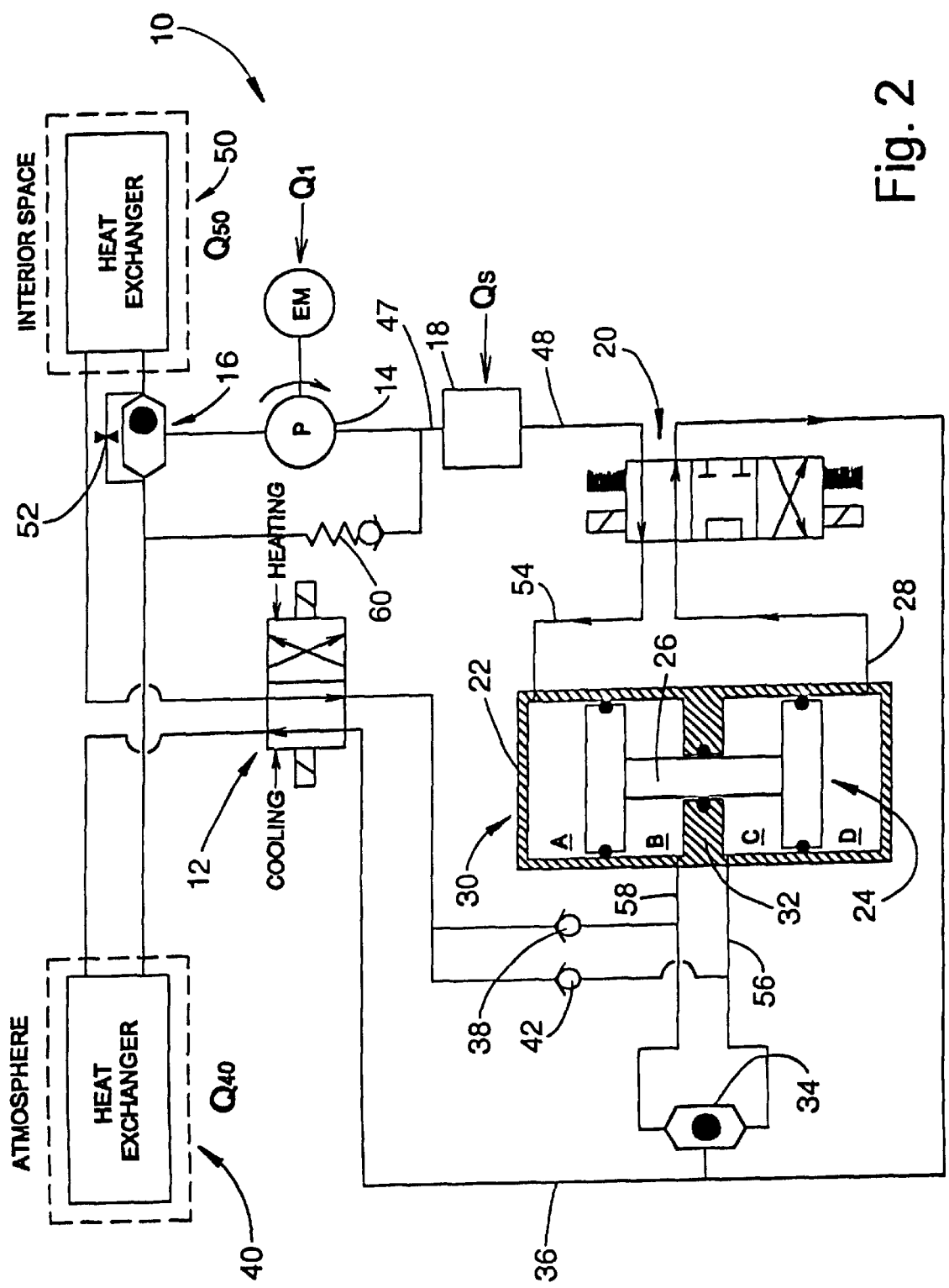
FIG. 2 is a schematic representation of the novel heat powered heat pump system constructed in accordance with the present invention.

FIG. 2 depicts the subject heat powered heat pump system. As shown, it is a device that can cool an interior space, and by reversing the operation cycle, can also be used to heat an interior space. If the device is used only for cooling or only for heating, certain components, such as a cooling/heating switch and a valve assembly can be altogether eliminated from the system.

Referring now to FIG. 2, there is shown a heat powered heat pump system 10 constructed in accordance with the present invention. This heat powered heat pump system 10 is readily scalable, as will be seen, making it applicable to cooling and heating uses in large spaces as well as smaller volumes, and can be readily carried on board vehicles with space limitations for such systems.

The heat powered heat pump system is comprised of three main components, a cooling/heating switch 12, a switching valve 20 and a novel four chamber compressor unit 30. Cooling/heating switch 12 can be set in a cooling position or a heating position. With cooling/heating switch 12 in the cooling position, the interaction of the components of the system will be described below.

To initiate functioning of the system 10, a pump/electric motor unit 14 is receiving liquid refrigerant from valve 16. The pump/electric motor unit 14 pressurizes and delivers liquid refrigerant to heat exchanger 18. Note that pump/electric motor unit 14 can be any device that can pressurize liquid refrigerant. Heat exchanger 18 receives the pressurized liquid refrigerant and adds available heat from a power source $Q_S$, discussed in greater detail below, which converts the liquid to a high pressure vapor. The high pressure vapor is supplied to switching valve 20 along high pressure vapor line 48.

For the purposes of safety, and since high pressure liquid is traveling along line 47 to heat exchanger 18, a relief/check valve assembly 60 is interposed between heat exchanger 18 and the pump 14.

Switching valve 20 is illustrated here in FIG. 2, supplying the high pressure vapor to chamber A of four chamber compressor unit 30. Also, switching valve 20 is exposing chamber D of compressor 30 to exhaust line 28. Compressor unit 30 consists of a compressor cylinder housing 22, and a double piston assembly 24, connected by a piston rod 26. The cylinder housing 22, in which this double piston assembly operates, has a divider 32 at its midpoint. Therefore, four separate chambers are created within compressor unit 30, and these compressor chambers are designated chambers A, B, C and D. If high pressure vapor is conducted, through switching valve 20, into chamber A, and chamber D is exposed, through switching valve 20, to exhaust line 28, then the double piston assembly 24 will move in a downward motion. This downward motion of the piston assembly 24 will cause the volume of chamber B to decrease, having a resulting compression effect, and simultaneously the volume of chamber C to increase, having a resulting suction effect.

This compression of the vapor in chamber B causes compressed vapor to be delivered to valve 34, which in turn allows vapor to be routed and delivered to cooling/heating switching valve 12, through line 36, and on to heat exchanger 40. Heat exchanger 40, a condenser, is exposed to the atmosphere and heat from the compression of the vapor, causes heat transfer to the atmosphere, which transforms the vapor back to a liquid state before returning to pump/electric motor unit 14 via valve assembly 16.

Referring back to FIG. 2, and more particularly to compressor 30, the downward motion of piston assembly 24 increases the volume of chamber C, which creates a suction, which effect through check valve 42 and cooling/heating valve 12 causes a low pressure on heat exchanger 50. At this same point in time, heat exchanger 50 is receiving liquid refrigerant, from throttling valve 52, located on valve assembly 16, which is a direct result of the formation of fluid in heat exchanger 40. This liquid refrigerant, in heat exchanger 50, is exposed to the low pressure and changes state back to a vapor, with the addition of available heat. This heat transfer to heat exchanger 50, is from the interior space, thus cooling the interior space.

The described process has covered the downward movement of the double piston assembly 24, and at which time switching valve 20 is alternatively switched such that now high pressure vapor is delivered to chamber D of compressor unit 30, and simultaneously chamber A is exposed to exhaust line 28 thru switching valve 20. This action causes the piston assembly 24 to move in an upward motion, which causes chamber C to compress vapor and deliver vapor through valve 34, to cooling/heating valve 12, and then on to heat exchanger 40. Also, the upward motion of the pistons causes chamber B of the compressor 30, to increase in volume causing suction and drawing vapor through check valve 38 from cooling/heating valve 12 and thus, from heat exchanger 50. This produces the same effect at the heat exchangers 40 and 50 as the downward motion of the piston assembly, heat being rejected at the condenser heat exchanger 40, and at the same time, heat being absorbed at heat exchanger 50, now the evaporator.

The switching time period on switching valve 20 is variable and can be specifically varied to determine the heat transfer rate of the system. In operation, when the system 10 is functioning with a short switching time period for switching valve 20, this causes faster cycling rates of the piston assembly 24 of compressor unit 30, and therefore, a higher heat transfer rate at the respective heat exchangers 40 and 50.

As the system has been described, in the interior cooling mode, and if we denote heat or energy transfer as positive "+" when put into the system, and as negative "−" when energy is transferred out of the system, we can write an energy balance equation as follows:

$$Q_1 + Q_S + Q_{50} - Q_{40} = 0 \text{ where } Q_1 = \text{pump input power}$$
$$Q_S = \text{energy from heat source}$$
$$\text{or} \quad Q_{50} = \text{interior heat transfer}$$
$$Q_{40} = \text{atmosphere heat transfer}$$
$$Q_1 + Q_S + Q_{50} = Q_{40}$$

Therefore, all heat/power is rejected to the atmosphere when the heat powered heat pump system 10 is in the cooling mode.

If the system is used to supply heat to the interior space, switching valve 20 is switched to the heating position, which in effect switches (reverses) the functions of the heat exchanger 40 and heat exchanger 50. Now, in this heating functioning mode, heat exchanger 40 has become an evaporator and heat exchanger 50 has become a condenser. The condenser function, to reject heat, is now in the interior space and will now heat the interior space. The heat exchanger functioning as an evaporator, here heat exchanger 40 is now located outside the interior space and has the ability to absorb heat from the atmosphere.

The energy balance equation now becomes:

$$Q_1 + Q_S + Q_{40} - Q_{50} = 0 \text{ where } Q_1 = \text{pump input power}$$
$$Q_S = \text{energy from heat source}$$
$$\text{or} \quad Q_{50} = \text{interior heat transfer}$$
$$Q_{40} = \text{atmosphere heat transfer}$$
$$Q_1 + Q_S + Q_{40} = Q_{50}$$

Therefore, during the heating mode of the system, $Q_{50}$ (interior heat transfer) is equal to the total energy input to the system 10, including the large heat input $Q_{40}$, from the atmosphere. When the system 10 is used to heat an electric car, $Q_1$ and $Q_S$ are consumed from the battery, but we also get the available heat picked up from the atmosphere $Q_{40}$. This will result in a decreased consumption of battery power for the same amount of heat to heat the cars interior, adding up to less energy required to operate the system 10, and much greater efficiency overall.

Moreover, still referring to FIG. 2, and the main component, namely, the compressor unit 30. The power supplied from switching valve 20 is conducted to the larger chambers A and D of the compressor. One could conduct the vapor power, from switching valve 20 to chambers B and C of the compressor unit 30. In this alternate configuration, vapor is then directed to chambers A and D, and subsequently conducted to check valves 42 and 38, and eventually on to valve 34.

Efficiency of the overall system 10 is greatly enhanced by the available heat input to heat exchanger 18. To illustrate this point, energy, in the form of heat is applied to heat exchanger 18 in many forms, here designated $Q_S$. This available heat might be generated by direct electrical power from a power grid, photovoltaic cells, wind power generators, and fuel cell technology, including proton exchange membrane fuel cells, and fuel cell designed for electric car power plants, such as zinc pellet fuel cells. Alternatively, the heat passed on to the heat exchanger 18 may be derived from hot water sources. This hot water may have been generated using all of the above systems, or directly through the use of solar power hot water generation (direct exposure panels, etc.). All of these methods to provide generated heat and/or waste heat from mechanical heat creation (for example engine waste heat) are factors in the overall greater operating efficiency realized with the subject heat powered heat pump system 10.

To outline the advantages and disadvantages of each method consider the following:

(I) Switching valve 20 powering chambers A and D: The required temperature of the main power source $Q_S$ will be significantly lower than the temperature required in method (II) described below. But, the overall efficiency of the total system 10 is lower than in method (II) below.

(II) Switching valve 20 powering chambers B and C: The required temperature of the power source $Q_S$ here is higher than in method (I) above, but the overall system 10 efficiency is higher than that of method (I) above.

Therefore, the temperature of the power (heat) source $Q_S$ will determine the interconnection method and thereby configuration between switching valve 20 and the compressor unit 30.

Figure 3:
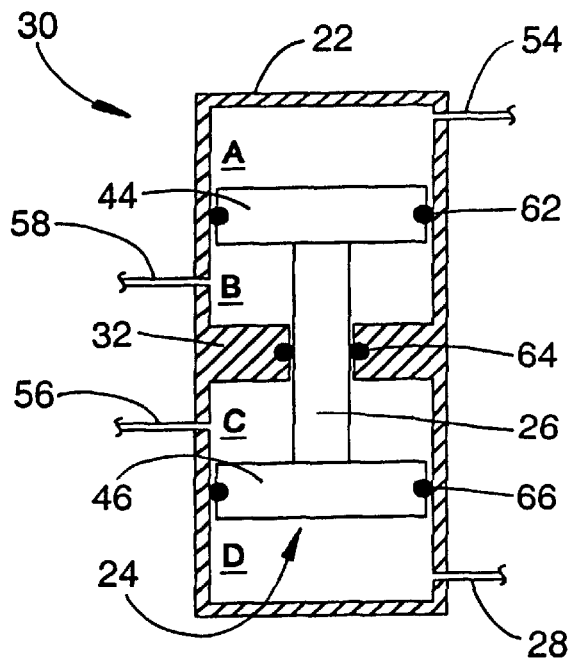
FIG. 3 is a cross-sectional side elevational view of the compressor unit component of the heat powered heat pump system constructed in accordance with the present invention.

Referring now to FIG. 3, there is shown an enlarged cross-sectional illustration of the compressor unit 30, in particular pointing out the presence and location of the important seals, sealing elements 62, 64, and 66. These sealing elements 62, 64, and 66 represent the necessary sliding seals within compressor unit 30. The sealing elements 62, 64, and 66 can be constructed from metallic materials, alloys, or elastomer sealing material. The elastomer sealing material would be chosen for compatibility with refrigerant fluids and the anticipated system operating temperature extremes. Note that sealing elements 62 and 66 act as piston rings, being centrally located at the piston heads 44 and 46 respectfully. Sealing element 64, located in compressor housing 22 divider 32, acts to seal the piston rod 26. Overall, the sealing elements 62, 64 and 66 act to insure that each compressor 30 chamber A, B, C and D do not come into fluid communication with one another. Therefore, these seals are vitally important to the operation of the compressor unit 30.

Figure 4:
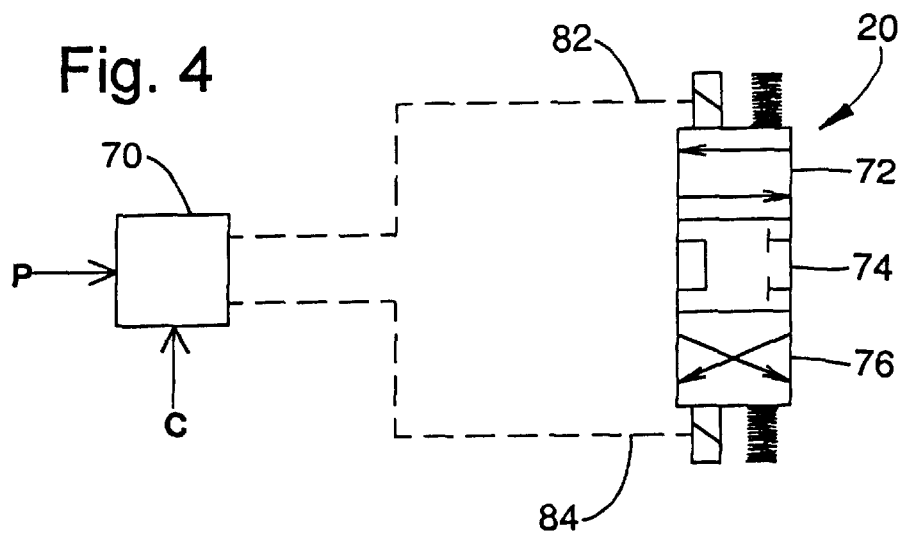
FIG. 4 is a schematic representation of a switching valve controller circuit for the heat pump system constructed in accordance with the present invention.

Referring now to FIG. 4, and more particularly to the details of the controlling mechanism for switching valve 20, there is shown the switching valve 20 wired to a controlling circuit 70. Switching valve 20 is a conventional three-position, electrically actuated, spring centered, four-way fluid diverter valve. Switching valve 20 has three positions, namely, a straight diversion position 72, a center "off" position 74, and a crossed diversion position 76. The center position 74 of switching valve 20 has the configuration of "blocked flow" on the fluid input and return ports of the valve 20, and the "working ports" supplying the compressor unit 30 (not shown here) are in fluid communication with the selected chambers of the compressor.

The cycling and frequency of the cycling between positions 72, 74 and 76 of switching valve 20 is controlled by an electrical control circuit 70. Electrical power, designated P, is switched and alternately supplied to outputs wires 82 and 84. The cycling of the electrical signals traveling to switching valve 20 from the control circuit 70 via output wires 82 and 84 is regulated by a control signal, designated signal C, acting on control circuit 70.

Signal C regulates the frequency at which power is applied to output wires 82 and 84. The circuit controller 70 has a delay in timing, or "dead time," after the signal to output wire 82 is removed and before the signal to output wire 84 is applied, and conversely, when a signal is removed from output wire 84 and before a signal is applied to output wire 82. This "dead time" feature allows switching valve 20 to remain in the center position for a predetermined amount of time, the advantages of which are described in greater detail below.

The frequency of the cycling rate of switching valve 20 will also determine the cycling rate of compressor 30 (not shown), which will in turn determine the rate of heat transfer if heat exchangers 40 and 50. When no heat transfer is required of heat exchangers 40 and 50, power input P is removed from controller circuit 70, which causes the cycling of switching valve 20 and compressor 30 to halt.

Figure 5:
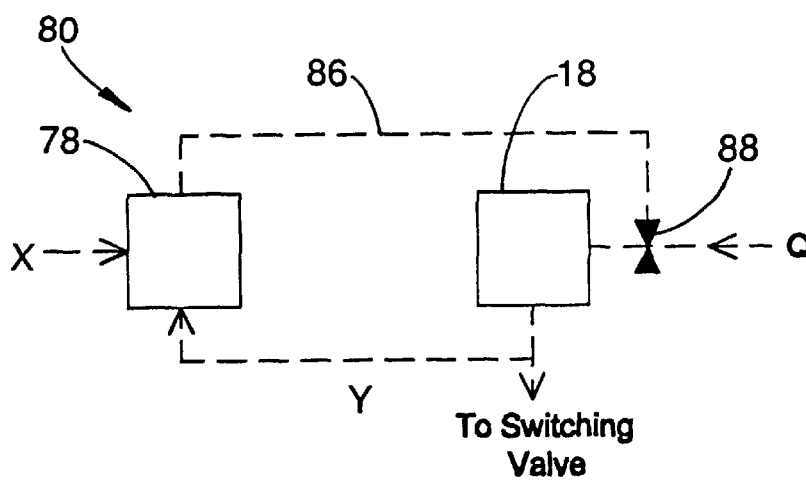
FIG. 5 is a schematic representation of a heat exchanger controller circuit for the heat pump system constructed in accordance with the present invention.

Referring now to FIG. 5, there is shown an alternative embodiment, including a power control system 80, to further improve the overall efficiency of the heat powered heat pump system 10, in particular by enabling the amount of power $Q_S$ supplied to heat exchanger 18 to be controlled and limited depending upon the rejection temperature of the acting condenser unit within the system.

Recall that heat exchangers 40 and 50, as shown in FIG. 1, can act as a condenser or an evaporator depending upon the position of switching valve 20. Therefore, the temperature of the power $Q_S$ supplied to heat exchanger 18 is proportional to the rejection temperature of the systems condenser heat exchanger at the time, whether it be heat exchanger 40 or heat exchanger 50.

FIG. 5 here depicts a power control system 80 that monitors the rejection temperature of the "condenser" heat exchanger, designated X, and monitors the temperature, designated Y, of the high-pressure vapor leaving heat exchanger 18. Depending upon the physical thermodynamic characteristics of the refrigerant fluid being used in the system, a circuit controller 78 maintains a differential relationship between temperature X and temperature Y by supplying a signal along output wire 86 to modulate the amount of power being supplied to heat exchanger 18. Signals traveling along output 86 could energize a flow valve 88 when the system is being powered by hot fluid (such as solar powered hot water generation). Alternatively, signals traveling along output 86 could energize a power relay (not shown) which would be located directly in substitution of flow valve 88, in the case where electrical power is being employed to power an electrical heating element to heat the refrigerant in heat exchanger 18.

Figure 6:
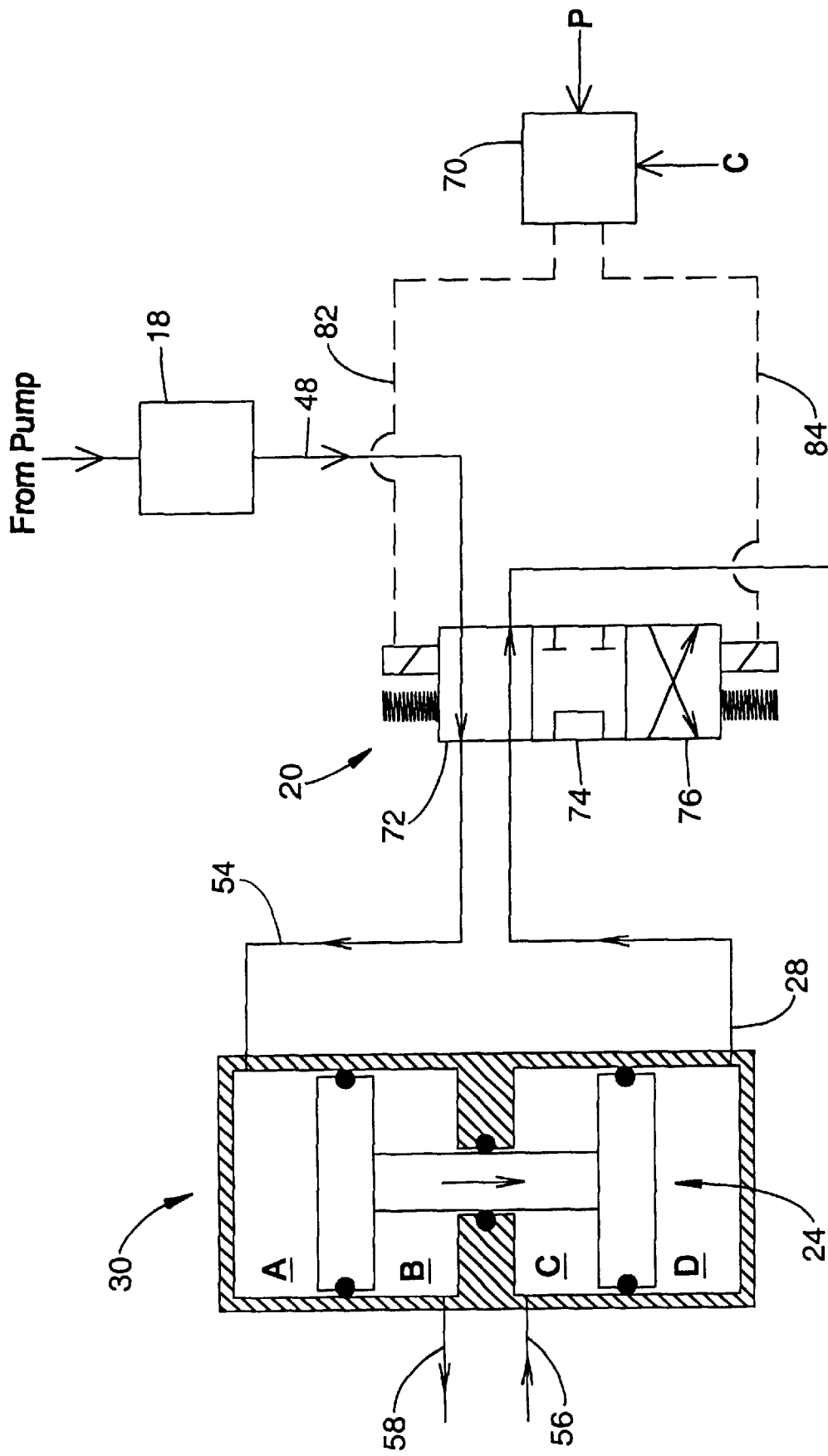
FIG. 6 is an enlarged partial schematic representation of the novel heat powered heat pump system constructed in accordance with the present invention further illustrating switching valve and piston assembly movement.
Figure 7:
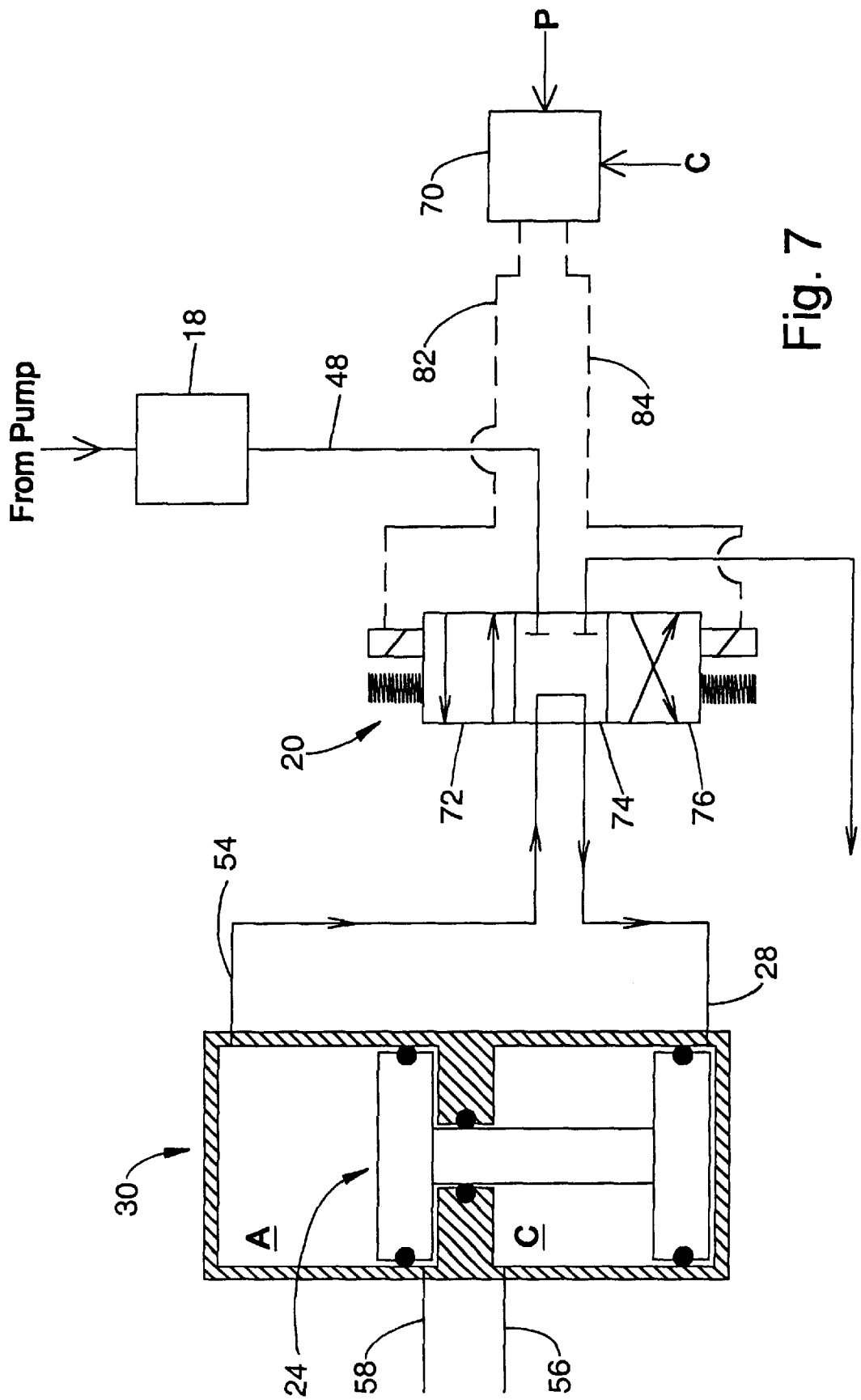
FIG. 7 is an enlarged partial schematic representation of the novel heat powered heat pump system constructed in accordance with the present invention further illustrating switching valve and piston assembly movement.
Figure 8:
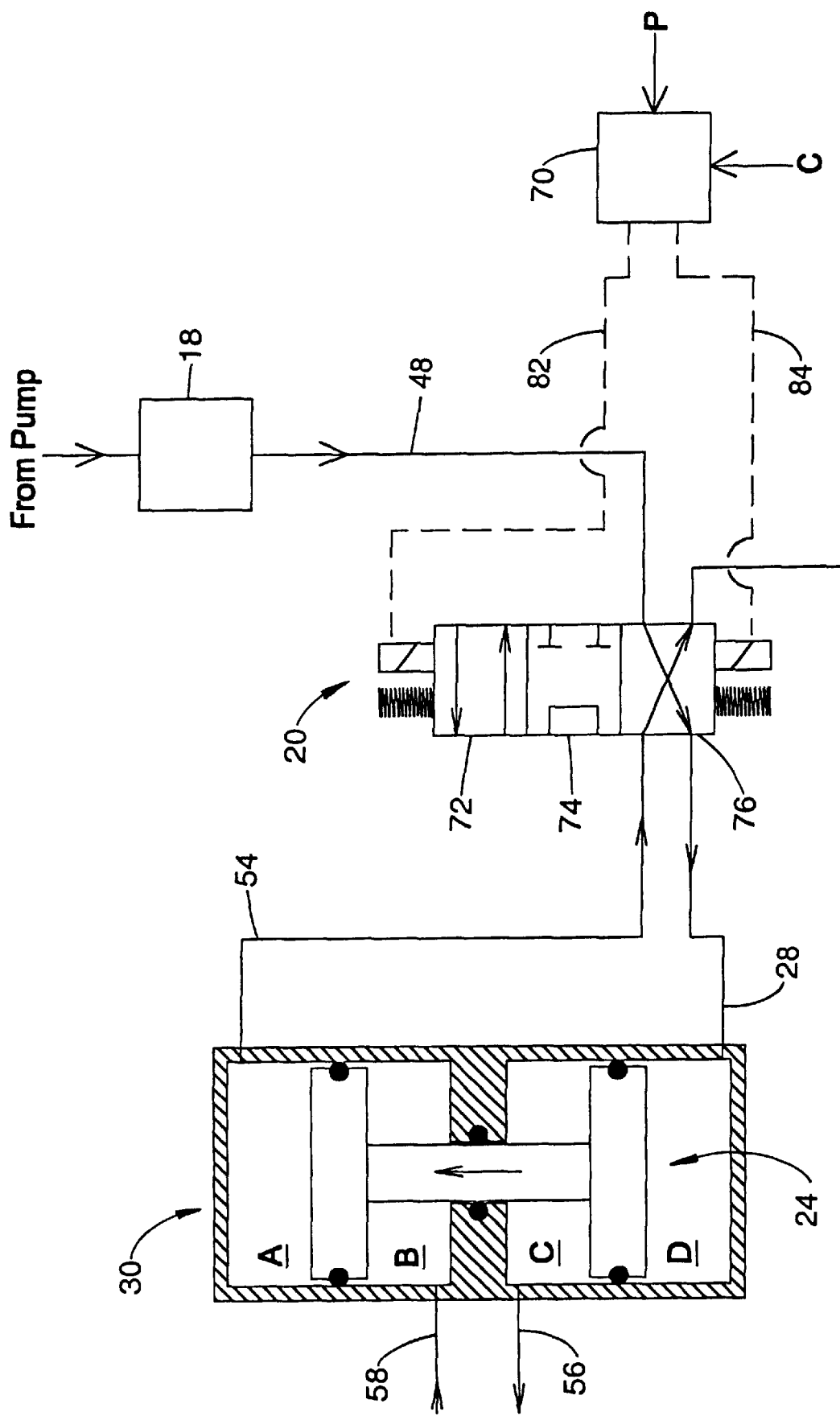
FIG. 8 is an enlarged partial schematic representation of the novel heat powered heat pump system constructed in accordance with the present invention further illustrating switching valve and piston assembly movement.

Referring now to FIGS. 6, 7 and 8, there is shown in greater detail the three positions of switching valve 20, namely the dynamics of the system during the cycling of switching valve 20 through each of the three positions of the switch.

Beginning with FIG. 6, switching valve 20 is receiving a signal from output wire 82 and consequently is in the straight open position 72. In this position 72, high pressure vapor is being supplied to compressor 30 chamber A and evacuating from chamber D along lines 54 and 28 respectively. This causes the internal double piston assembly 24 to move downwardly, thereby exhausting vapor out of chamber D and chamber B, while simultaneously receiving vapor into chamber C by the movement action of the piston heads.

FIG. 7 depicts the double piston assembly 24 as having reached its maximum downward stroke. At this point, the electric signal along output wire 82 has been discontinued, and removed from switching valve 20 by circuit controller 70, thereby allowing switching valve 20 to move to its center position. Control circuit 70 could be sensing the maximum travel position of piston assembly 24, by using a position sensor device (not shown), to facilitate the switching sequence of switching valve 20. This allows the pressurized vapor in compressor 30 chamber A to communicate through switching valve 20 and move into chamber D and pressurize chamber D. This sequence of events improves the operating efficiency of the overall system 10 since the vapor pressure in chamber A is not completely exhausted to condenser 40 (not shown, see FIG. 1) through switching valve 20.

Referring now to FIG. 8, there is shown the last cycle of piston movement in the heat powered heat pump system 10. Here, after a pre-determined time, the "dead time," circuit controller 70 applies an electrical current along output wire 84 to switching valve 20 which causes switching valve 20 to supply high pressure vapor to chamber D of compressor 30. As a result, the piston assembly 24 moves in an upwardly fashion as depicted by the arrow of movement. When the piston assembly 24 reaches its maximum upward stroke, the cycle begins again, as described in FIG. 6.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A heat powered heat pump system comprising:
   (a) fluid refrigerant and fluid refrigerant pump means;
   (b) switching valve means having two open positions and one blocked off position for the purpose of selectively directing the flow of said refrigerant;
   (c) heat exchanger means which acts as a heat powered refrigerant compressor capable of receiving and transferring available external heat to vaporize all of said liquid refrigerant passing through said heat exchanger means, interposed between said refrigerant pump means and said switching valve means, for the purpose of applying available external heat to said refrigerant thereby vaporizing all of said refrigerant;
   (d) thermal compressor means having a compressor housing, a double piston assembly and four sealed chambers such that said four sealed chambers are not in direct fluid communication with any other of said four sealed chambers, whereby said thermal compressor means utilizes heat energy to power the refrigerant compression process and liquid refrigerant vaporization; and (e) one or more heat exchanger means which can function as condensers or evaporators within said system, wherein said compressor means is interposed between said switching valve means and said one or more heat exchanger means.

2. The heat powered heat pump system according to claim 1, wherein said thermal compressor means utilizes heat energy to power the refrigerant compression process and liquid refrigerant vaporization, further comprising a cooling/heating switching means and two or more heat exchanger means which can function as condensers or as evaporators within the same system, for the purpose of allowing selective heating or cooling a space using the system.

3. The heat powered heat pump system according to claim 1, wherein said switching valve means having two open positions, further includes a straight open position and a crossed open position for the purpose of selectively directing said refrigerant to or from two of said four compressor chambers.

4. The heat powered heat pump system according to claim 1, wherein said thermal compressor means utilizes heat energy to power the refrigerant compression process and liquid refrigerant vaporization, and further wherein said switching valve means includes a three-position, electrically actuated, spring centered, four-way fluid diverter valve.

5. The heat powered heat pump system according to claim 1, wherein said heat exchanger means which acts as a heat powered refrigerant compressor capable of receiving and transferring available external heat to vaporize all of said liquid refrigerant passing through said heat exchanger means, interposed between said refrigerant pump means and said switching valve means, for the purpose of applying available external heat to said refrigerant and thereby vaporizing all of said liquid refrigerant, accepts external available heat from waste energy given off by an existing power plant.

6. The heat powered heat pump system according to claim 5, wherein said heat exchanger means which acts as a heat powered refrigerant compressor capable of receiving and transferring available external heat to vaporize all of said liquid refrigerant passing through said heat exchanger means, interposed between said refrigerant pump means and said switching valve means, for the purpose of applying available external heat to said refrigerant and thereby vaporizing all of said liquid refrigerant, accepts external available heat from waste energy given off by an existing power plant and said power plant includes a vehicle engine.

7. The heat powered heat pump system according to claim 1, wherein said heat exchanger means capable of receiving and transferring available external heat, interposed between said refrigerant pump means and said switching valve means, for the purpose of applying available external heat to said refrigerant, accepts external available heat from an existing electrical heating element.

8. The heat powered heat pump system according to claim 7, wherein said heat exchanger means capable of receiving and transferring available external heat, interposed between said refrigerant pump means and said switching valve means, for the purpose of applying available external heat to said refrigerant, accepts external available heat from an existing electrical heating element includes a heating element powered by a vehicle battery.

9. The heat powered heat pump system according to claim 7, wherein said heat exchanger means capable of receiving and transferring available external heat, interposed between said refrigerant pump means and said switching valve means, for the purpose of applying available external heat to said refrigerant, accepts external available heat from an existing electrical heating element includes a heating element powered by electrical grid derived electrical energy.

10. The heat powered heat pump system according to claim 7, wherein said heat exchanger means capable of receiving and transferring available external heat, interposed between said refrigerant pump means and said switching valve means, for the purpose of applying available external heat to said refrigerant, accepts external available heat from an existing electrical heating element includes a heating element powered by photovoltaic cells.

11. The heat powered heat pump system according to claim 7, wherein said heat exchanger means capable of receiving and transferring available external heat, interposed between said refrigerant pump means and said switching valve means, for the purpose of applying available external heat to said refrigerant, accepts external available heat from an existing electrical heating element includes a heating element powered by a fuel cell.

12. The heat powered heat pump system according to claim 1, wherein said heat exchanger means capable of receiving and transferring available external heat, interposed between said refrigerant pump means and said switching valve means, for the purpose of applying available external heat to said refrigerant, accepts external available heat from a solar powered water heating element.

13. The heat powered heat pump system according to claim 1, further including a control circuit for the purpose of controlling the frequency of switching between said two open and one closed position of said switching valve means, thereby directing the cycling rate of said compressor means, which will in turn determine the rate of heat transfer of said one or more heat exchanger means which can function as condensers or evaporators within said system.

14. The heat powered heat pump system according to claim 1, further including a power control circuit that monitors the rejection temperature of any of said one or more heat exchangers acting as a condenser or evaporator heat exchanger, and monitors the temperature of said refrigerant exiting said heat exchangers means capable of receiving and transferring available external heat, interposed between said refrigerant pump means and said switching valve means, for the purpose of applying available external heat to said refrigerant, whereby said power control circuit maintains a differential relationship between said temperatures by supplying an electrical signal for the purpose of modulating the amount of power being supplied to said heat exchanger means capable of receiving and transferring available external heat.

15. A method for making a heat powered heat pump system comprising the steps of:

(a) providing fluid refrigerant and fluid refrigerant pump means;

(b) providing switching valve means having two open positions and one blocked off position for the purpose of selectively directing the flow of said refrigerant;

(c) providing heat exchanger means capable of receiving and transferring available external heat, interposed between said refrigerant pump means and said switching valve means, for the purpose of applying available external heat to said refrigerant;

(d) applying available external heat to said heat exchanger means capable of receiving and transferring available external heat;

(e) providing a thermal compressor means having a compressor housing, a double piston assembly and four sealed chambers such that said four sealed chambers are not in direct fluid communication with any other of said four sealed chambers;

(f) providing one or more heat exchanger means which can function as condensers or evaporators within said system, wherein said compressor means is interposed between said switching valve means and said one or more heat exchanger means;

(g) providing transmission lines for directing the flow of said refrigerant; and (h) assembling said fluid refrigerant pump means, switching valve means, heat exchanger means capable of receiving and transferring available external heat, interposed between said refrigerant pump means and said switching valve means, for the purpose of applying available external heat to said refrigerant, thermal compressor means, and one or more heat exchanger means which can function as condensers or evaporators within said system, wherein said compressor means is interposed between said switching valve means and said one or more heat exchanger means, using said transmission lines to enable fluid communication between all of the aforementioned components.

16. The method for making a heat powered heat pump system according to claim 15, further comprising the step of providing a cooling/heating switching means, and the step of providing two or more heat exchanger means which can function as condensers or as evaporators within the same system, for the purpose of allowing selective heating or cooling a space using the system.

17. The method for making a heat powered heat pump system according to claim 15, wherein said step of providing switching valve means includes providing a switching valve means having two open positions, including a straight open position and a crossed open position for the purpose of selectively directing said refrigerant to or from two of said four compressor chambers.

18. The method for making a heat powered heat pump system according to claim 15, wherein said step of providing switching valve means includes providing a three-position, electrically actuated, spring centered, four-way fluid diverter valve.

19. The method for making a heat powered heat pump system according to claim 15, wherein said step of applying available heat to said heat exchanger means capable of receiving and transferring available external heat includes applying available heat from waste energy given off by an existing power plant.

20. The method for making a heat powered heat pump system according to claim 19, wherein said step of applying waste heat from an existing power plant includes applying waste heat from a vehicle engine.

21. The method for making a heat powered heat pump system according to claim 15, wherein said step of applying available heat to said heat exchanger means capable of receiving and transferring available external heat includes applying available heat from an electrical heating element.

22. The method for making a heat powered heat pump system according to claim 21, wherein said step of applying available heat to said heat exchanger means capable of receiving and transferring available external using an electrical heating element, includes an electrical heating element powered by a vehicle battery.

23. The method for making a heat powered heat pump system according to claim 15, further comprising the step providing a control circuit, and the step of controlling said switching valve for the purpose of controlling the frequency of switching between said two open and one closed position of said switching valve means, thereby directing the cycling rate of said compressor means, which will in turn determine the rate of heat transfer of said one or more heat exchanger means which can function as condensers or evaporators within said system.

24. The method for making a heat powered heat pump system according to claim 15, further comprising the steps of:

(a) providing a power control circuit that monitors the rejection temperature of any of said one or more heat exchangers acting as a condenser or evaporators heat exchangers, and monitors the temperature of said refrigerant exiting said heat exchangers means capable of receiving and transferring available external heat, interposed between said refrigerant pump means and said switching valve means, for the purpose of applying available external heat to said refrigerant, (b) monitoring said temperatures using said power control circuit;

(c) maintaining a differential relationship between said temperatures by supplying an electrical signal for the purpose of modulating the amount of power being supplied to said heat exchanger means capable of receiving and transferring available external heat;

(d) modulating the amount of power being supplied to said heat exchanger means capable of receiving and transferring available external heat; and (e) applying only the amount of heat necessary to cycle said switching valve means, for the purpose of operating the overall system efficiently.

* * * * *